United States Patent
Winter et al.

(10) Patent No.: US 11,643,996 B2
(45) Date of Patent: May 9, 2023

(54) ROCKET COMBUSTION CHAMBER WALL HAVING COOLING CHANNELS AND METHOD FOR MAKING THEREOF

(71) Applicant: ArianeGroup GmbH, Taufkirchen (DE)

(72) Inventors: Stefan Winter, Ebersberg (DE); Martin Malisz, Munich (DE)

(73) Assignee: ArianeGroup GmbH, Taufkirchen (DE)

( * ) Notice: Subject to any disclaimer, the term of this patent is extended or adjusted under 35 U.S.C. 154(b) by 0 days.

(21) Appl. No.: 17/544,032

(22) Filed: Dec. 7, 2021

(65) Prior Publication Data

US 2022/0195965 A1    Jun. 23, 2022

(30) Foreign Application Priority Data

Dec. 17, 2020 (DE) .......................... 102020133967.4

(51) Int. Cl.
*F02K 9/64* (2006.01)
*F02K 9/97* (2006.01)

(52) U.S. Cl.
CPC ................ *F02K 9/64* (2013.01); *F02K 9/972* (2013.01)

(58) Field of Classification Search
CPC ............. F02K 9/64; F02K 9/972; F23R 3/005
See application file for complete search history.

(56) References Cited

U.S. PATENT DOCUMENTS 3,043,103 A * 7/1962 Dent ....................... F02K 9/972
                                              165/169
3,154,914 A * 11/1964 Stockel ..................... F02K 9/64
                                              60/260

(Continued)

FOREIGN PATENT DOCUMENTS

DE    1983338 U    4/1968
DE    1941296 A    3/1971

(Continued)

OTHER PUBLICATIONS

European Patent Office, Extended European Search Report in European Patent Application No. 21204789.8 (dated Apr. 11, 2022).

(Continued)

*Primary Examiner* — William H Rodriguez
(74) *Attorney, Agent, or Firm* — Leydig, Voit & Mayer, Ltd.

(57) ABSTRACT

A combustion chamber suitable in particular for use in an engine comprises a combustion space, a combustion space wall delimiting the combustion space, and a plurality of cooling channel webs extending from a surface of the combustion space wall which faces away from the combustion space and separating mutually adjacent cooling channels from one another. The cooling channel webs are each provided with a projection extending from an end face of the cooling channel webs which faces away from the combustion space. Furthermore, the combustion chamber comprises a plurality of cover elements, wherein each cover element extends along a longitudinal axis of a cooling channel delimited by two mutually adjacent cooling channel webs between the projections of the mutually adjacent cooling channel webs and is form-fittingly connected to the projections of the two mutually adjacent cooling channel webs in order to cover the cooling channel.

16 Claims, 5 Drawing Sheets

(56) References Cited

U.S. PATENT DOCUMENTS

| | | | | | |
|---|---|---|---|---|---|
| 3,182,448 | A | * | 5/1965 | Rabe | F02K 9/64 60/260 |
| 3,613,207 | A | | 10/1971 | Malburg | |
| 3,630,449 | A | * | 12/1971 | Butler | F02K 9/64 239/132.3 |
| 3,692,637 | A | * | 9/1972 | Dederra et al. | F02K 9/64 29/DIG. 12 |
| 3,780,533 | A | * | 12/1973 | Huang | F02K 9/64 60/260 |
| 3,832,847 | A | * | 9/1974 | Butter | F02K 9/64 60/260 |
| 3,897,316 | A | * | 7/1975 | Huang | F02K 9/64 29/455.1 |
| 4,078,604 | A | * | 3/1978 | Christi | F02K 9/64 60/260 |
| 4,199,937 | A | * | 4/1980 | Fortini | F02K 9/64 239/127.1 |
| 4,707,225 | A | * | 11/1987 | Schuler | C25D 1/02 29/890.01 |
| 5,075,966 | A | * | 12/1991 | Mantkowski | C23C 28/00 29/458 |
| 5,249,357 | A | * | 10/1993 | Holmes | F02K 9/64 427/236 |
| 7,740,161 | B2 | * | 6/2010 | Boman | F02K 9/64 228/101 |
| 7,854,395 | B1 | * | 12/2010 | Jones | F02K 9/64 239/127.1 |
| 2011/0192137 | A1 | | 8/2011 | Maeding | |
| 2018/0010552 | A1 | * | 1/2018 | Brummer | F02K 9/972 |

FOREIGN PATENT DOCUMENTS

| | | |
|---|---|---|
| DE | 69918452 T2 | 7/2005 |
| DE | 102018102222 A1 | 8/2019 |
| JP | S56146038 A | 11/1981 |
| JP | S6153447 A | 3/1986 |
| JP | S62250104 A | 10/1987 |
| JP | 2018204816 A | 12/2018 |

OTHER PUBLICATIONS

German Patent and Trademark Office, Office Action in Priority German Patent Application No. 10 2020 133 967.4, 8 pp. (dated Jul. 12, 2021).

Japan Patent Office, Office Action in Japanese Patent Application No. 2021-204013 (dated Oct. 18, 2022).

\* cited by examiner

ROCKET COMBUSTION CHAMBER WALL HAVING COOLING CHANNELS AND METHOD FOR MAKING THEREOF

CROSS-REFERENCES TO RELATED APPLICATIONS

This application claims the benefit of the German patent application No. 10 2020 133 967.4 filed on Dec. 17, 2020, the entire disclosures of which are incorporated herein by way of reference

FIELD OF THE INVENTION

The invention relates to a combustion chamber particularly suitable for use in an engine and to a method of manufacturing such a combustion chamber. Furthermore, the invention relates to an engine equipped with such a combustion chamber.

BACKGROUND OF THE INVENTION

In modern engines suitable for use in rockets and satellites, hydrogen is usually burned with oxygen to generate thrust. By using hydrogen as a propellant, a high energy yield and consequently a high specific impulse of the engine can be achieved. However, when hydrogen is combusted, high combustion temperatures are reached, particularly in a combustion chamber of the engine, resulting in a high thermal load on the combustion chamber components. Combustion chambers provided for use in an engine are therefore typically double-walled and comprise an inner wall surrounding a combustion space of the combustion chamber, and an outer wall arranged coaxially with the inner wall to support the mechanical loads acting on the combustion chamber during operation of the combustion chamber. Cooling channels are formed between the inner wall and the outer wall, and are laterally delimited by cooling channel webs extending between the inner wall and the outer wall. Such a combustion chamber architecture is described, for example, in DE 10 2016 212 314 A1.

During operation of the engine, a coolant flows through the cooling channels. In the case of regenerative cooling of the engine, a fuel component, in particular hydrogen, is used as the coolant. Heat of reaction generated during combustion in a combustion space of the combustion chamber can then be transferred to the coolant flowing through the cooling channels via the inner wall of the combustion chamber consisting of a thermally conductive material, for example a copper alloy, and transported away.

In combustion chambers currently used in engines, the inner wall and the cooling channel webs are usually formed in one piece. For example, the inner wall may be provided in the region of its outer surface with a ribbed structure forming the cooling channel webs, which may be introduced into the outer surface of the inner wall by mechanical machining, for example milling. Interstices present between the ribs or cooling channel webs are then filled with wax to form a flat application surface for an outer wall to be electroplated. For example, the outer wall may consist of a thin copper alloy layer and an overlying nickel alloy layer which are successively electroplated onto the planar application surface formed by waxing out the cooling channels. Finally, the cooling channels are exposed by melting out the wax introduced between the cooling channel webs. The melted wax, usually a graphite/oil emulsion, must then be disposed of.

DE 10 2010 007 272 A1 describes a regeneratively cooled nozzle extension for a rocket combustion chamber, which comprises a first wall and a second wall as well as cooling channels arranged between the first and the second wall. The cooling channels are laterally delimited by cooling channel webs integrally formed with the first wall. Ends of the cooling channel webs which face away from the first wall are formed in a dovetail shape, and are received in recesses formed in the second wall when the second wall is connected to the cooling channel webs. A forming of the second wall produces a form fit between the dovetailed ends of the cooling channel webs and the recesses, thereby connecting the second wall to the first wall.

DE 10 2016 212 314 A1 discloses a combustion chamber having a combustion space, a first wall surrounding the combustion space, and a plurality of cooling channel webs extending from a surface of the first wall and separating adjacent cooling channels from each other. The cooling channel webs have, at their end facing away from the surface of the first wall, a bent portion that at least partially covers a cooling channel adjacent to the cooling channel web.

SUMMARY OF THE INVENTION

The invention is directed to the object to provide a combustion chamber which is simple to manufacture and which is suitable in particular for use in an engine. Furthermore, the invention is directed to the object to provide a simplified method of manufacturing a combustion chamber which is in particular suitable for use in an engine. Finally, the invention is directed to the object to provide an engine equipped with such a combustion chamber.

A combustion chamber particularly suitable for use in an engine, for example a rocket engine or a satellite engine, comprises a combustion space in which a propellant is burned during operation of the combustion chamber, thereby generating thrust. For example, oxygen and hydrogen may be supplied to the combustion space during operation of the combustion chamber. Further, the combustion chamber includes a combustion space wall delimiting the combustion space and a plurality of cooling channel webs extending from a surface of the combustion space wall which faces away from the combustion space and separating mutually adjacent cooling channels. The combustion space wall may be a wall directly bounding the combustion space, preferably consisting of a material having a high thermal conductivity, such as copper or a copper alloy. Furthermore, the combustion space wall may be provided with a surface layer, in particular a high temperature resistant coating, which protects the combustion space wall from the high temperatures prevailing in the combustion space of the combustion chamber.

The cooling channel webs can be designed as separate components and connected to the combustion space wall by a suitable joining technique, such as welding or soldering. Preferably, however, the cooling channel webs are integrally formed with the combustion space wall. Cooling channel webs formed integrally with the combustion space wall can be manufactured, for example, by mechanical machining, such as milling, of a semi-finished product provided for forming the combustion space wall and the cooling channels. Alternatively, it is also conceivable to manufacture the combustion space wall with integrally formed cooling channel webs by an additive manufacturing process. Preferably, the cooling channels extend substantially along a longitudinal axis of the combustion chamber and thus substantially perpendicular to a circumferential direction of the combustion chamber.

The cooling channel webs are each provided with a projection extending from an end face of the cooling channel webs which faces away from the combustion space. Preferably, the end face of the cooling channel webs which faces away from the combustion space extends substantially parallel to the surface of the combustion space wall facing away from the combustion space. Compared to the cooling channel webs, the projections preferably have a reduced cross-section, i.e. in a direction parallel to the surface of the combustion space wall which faces away from the combustion space and perpendicular to a longitudinal axis of a cooling channel delimited by two mutually adjacent cooling channel webs, the cooling channel webs preferably have a larger dimension than the projections provided on the cooling channel webs. To the contrary, along the longitudinal axes of cooling channels, the cooling channel webs and the projections formed thereon preferably have substantially the same dimensions, i.e. the cooling channel webs are preferably provided with corresponding projections along their entire length along the longitudinal axes of the cooling channels.

Finally, the combustion chamber comprises a plurality of cover elements. Each cover element extends along a longitudinal axis of a cooling channel delimited by two mutually adjacent cooling channel webs between the projections of the mutually adjacent cooling channel webs. Further, each cover element is form-fittingly connected to the projections of the two mutually adjacent cooling channel webs in oder to cover the cooling channel. In other words, in the combustion chamber, the cooling channels are closed by separately formed cover elements which are arranged between the projections of two mutually adjacent cooling channel webs and which are then form-fittingly connected to the projections.

When manufacturing the combustion chamber, it is not necessary to first fill the cooling channels with wax, then close them and finally melt out the wax again. Furthermore, the form-fittingly connecting of the cover elements to the projections is a robust process that does not require tight tolerances. The combustion chamber is therefore particularly easy and inexpensive to manufacture.

The cover elements of the combustion chamber preferably each have edge portions which rest on corresponding end face portions of the two mutually adjacent cooling channel webs. The edge portions of a cover element preferably extend substantially parallel to each other along the longitudinal axis of the cooling channel closed by means of the cover element. Accordingly, the end face portions of the cooling channel webs on which the edge portions of the cover element rest preferably extend substantially parallel to each other along the longitudinal axis of the cooling channel closed by means of the cover element.

In a direction parallel to the surface of the combustion space wall which faces away from the combustion space and perpendicular to a longitudinal axis of a cooling channel delimited by two mutually adjacent cooling channel webs, the projections provided on the cooling channel webs may extend centrally from the end face of the cooling channel webs which faces away from the combustion space. As a result of the central arrangement of the projections on the cooling channel webs, end face portions remaining on both sides of the projections are large enough to serve as a secure bearing surface for corresponding edge portions of the cover elements. Each projection of a cooling channel web can then be form-fittingly connected to two cover elements.

In the fully assembled combustion chamber, a dimension of the projections provided on the cooling channel webs in a direction perpendicular to the end face of the cooling channel webs which faces away from the combustion space preferably substantially corresponds to a dimension of the cover elements in the direction perpendicular to the end face of the cooling channel webs which face away from the combustion space. In other words, in the fully assembled combustion chamber, the projections and the cover elements form-fittingly connected to the projections form an outer combustion chamber wall having continuously substantially the same thickness. In contrast, prior to the form-fitting connection to the cover elements, the dimension of the projections perpendicular to the end face of the cooling channel webs may be slightly larger than the corresponding dimension of the cover elements. In this way, the projections can be well crimped with the cover elements, for example by means of a rolling tool, and thereby form-fittingly connected to the cover elements.

In the fully assembled combustion chamber, an outer surface of the cover elements which faces away from the combustion space is preferably aligned substantially coplanar with end faces of the projections provided on the cooling channel webs which face away from the combustion space. The coplanar alignment of the outer surface of the cover elements with the end faces of the projections may already be achieved by the above-described dimensioning of the projections and the cover elements. However, if necessary, any excess material remaining after the cover elements have been form-fittingly connected to the projections may be removed by a machining process such as turning.

Additionally or alternatively, the outer combustion chamber wall defined by the cover elements and the projections provided on the cooling channel webs may be oriented substantially parallel and/or coaxial to the combustion space wall. The cover elements may be made, for example, by eroding, laser cutting or stamping. In particular, the cover elements may be made of a metal sheet. A material having a high thermal conductivity, such as copper, is particularly suitable for manufacturing the cover elements. The cover elements may therefore be made, for example, from a sheet of copper.

At a at a first end facing end, the cooling channels are preferably delimited by a first end element. For example, the cooling channels may be shaped such that the depth of the cooling channels decreases towards their first end facing end. This may be realized, for example, by the thickness of the combustion space wall increasing towards the first end facing ends of the cooling channels and the thickened region of the combustion space wall forming the first cover element. Preferably, the cover elements are each form-fittingly connected to the first end element.

This can be accomplished, for example, by first providing a projection on the first end elements which extends, for example, substantially perpendicularly to a surface of the first end elements which faces away from the combustion space. This projection can then, similar to the projections formed on the cooling channel webs, for example be crimped to the cover elements and thereby form-fittingly connected to the cover elements. In principle, for each cooling channel and consequently for each cover element, a separate projection may be provided on the corresponding first end element. However, it is also conceivable to provide projections or only one projection extending over several/all first end elements and consequently several/all cover elements.

At a second end facing end, the cooling channels are preferably delimited by a second end element. For example, the cooling channels may be shaped such that the depth of the cooling channels decreases towards their second end facing end. This may be realized, for example, by the thickness of the combustion space wall increasing in the direction of the second end facing ends of the cooling channels and the thickened region of the combustion space wall forming the second end element. In the region of the second end facing ends of the cooling channels, preferably no form-fitting connection of the second end elements to the cover elements is provided. Rather, a pressure equalization opening may be provided at each of the second end facing ends of the cooling channels between the cover elements and the second end elements.

The outer combustion chamber wall defined by the cover elements and the projections provided on the cooling channel webs may be provided with a surface layer applied to the outer surface of the cover elements which faces away from the combustion space and to the end faces of the projections provided on the cooling channel webs which face away from the combustion space. Preferably, the surface layer is selected to improve the mechanical load capacity of the combustion chamber. For example, the outer combustion chamber wall may be provided with a nickel layer.

If the surface layer is produced by cold gas spraying followed by heat treatment, the pressure equalization openings provided at the second end facing ends of the cooling channels prevent the pressure in the coolant channels from increasing too much during the heat treatment. On the other hand, when the surface layer is produced by an electroplating process, heat treatment of the surface layer is generally not required. The pressure equalization openings at the second end facing ends of the coolant channels should then be dispensed with in order to ensure that the coolant channels are tight in the finished combustion chamber.

The cover elements may then, for example, each be form-fittingly connected to the second end element. For this purpose, a projection may be provided on each of the second cover elements, which projection initially extends substantially perpendicularly to a surface of the second cover elements which faces away from the combustion space and is then crimped to the cover elements and thereby form-fittingly connected to the cover elements. In principle, a separate projection may be provided on the corresponding second end element for each cooling channel and consequently for each cover element. However, it is also conceivable to provide projections or only one projection extending over several/all second end elements and consequently several/all cover elements.

In a method of manufacturing a combustion chamber particularly suitable for use in an engine, first a combustion space wall delimiting a combustion space is provided. Furthermore, a plurality of cooling channel webs are provided which extend from a surface of the combustion space wall which faces away from the combustion space and separate mutually adjacent cooling channels from one another. The cooling channel webs are each provided with a projection extending from an end face of the cooling channel webs which face away from the combustion space. A plurality of cover elements are arranged such that each cover element extends along a longitudinal axis of a cooling channel delimited by two mutually adjacent cooling channel webs between the projections of the mutually adjacent cooling channel webs. Finally, each cover element is form-fittingly connected to the projections of two mutually adjacent cooling channel webs in order to cover the cooling channel extending between the mutually adjacent cooling channel webs.

The form-fitting connection between the projections provided on the cooling channel webs and the cover elements can be produced, for example, by rolling. However, the projections provided on the cooling channel webs can also be form-fittingly connected to the cover elements by caulking and/or flanging.

Preferably, the cover elements are arranged such that edge portions of the cover elements rest on corresponding end face portions of the two mutually adjacent cooling channel webs. The projections provided on the cooling channel webs may extend in a direction parallel to the surface of the combustion space wall which faces away from the combustion space and perpendicular to the longitudinal axis of a cooling channel delimited by two mutually adjacent cooling channel webs, centrally from the end face of the cooling channel webs which faces away from the combustion space. Each projection can then preferably be form-fittingly connected to two cover elements.

A dimension of the projections provided on the cooling channel webs in a direction perpendicular to the end face of the cooling channel webs which faces away from the combustion space preferably substantially corresponds to a dimension of the cover elements in the direction perpendicular to the end face of the cooling channel webs which faces away from the combustion space. An outer surface of the cover elements which faces away from the combustion space is preferably aligned substantially coplanar with end faces of the projections provided on the cooling channel webs which face away from the combustion space. If necessary, a machining process, for example face cutting, may be used for this purpose. An outer combustion chamber wall defined by the cover elements and the projections provided on the cooling channel webs is aligned substantially parallel and/or coaxial to the combustion space wall.

The cover elements can be produced, for example, by eroding, laser processing or punching. Additionally or alternatively, the cover elements can be produced from a sheet, in particular a metal sheet and particularly preferably a copper sheet.

The cooling channels are preferably delimited at a first end facing end by a first cover element. The cover elements may be form-fittingly connected to the first end elements. For example, a projection provided on the first end elements and extending, for example, substantially perpendicularly to a surface of the first end elements which faces away from the combustion space may be crimped to the cover elements and thereby form-fittingly connected to the cover elements.

At a second end facing end, the cooling channels are preferably delimited by a second end element. In the area of the second end facing ends of the cooling channels, preferably no form-fitting connection of the second end elements with the cover elements is provided, but rather a pressure equalization opening is arranged between the cover elements and the second end elements.

The outer combustion chamber wall defined by the cover elements and the projections provided on the cooling channel webs may be provided with a surface layer applied to the outer surface of the cover elements which faces away from the combustion space and to the end faces of the projections provided on the cooling channel webs which face away from the combustion space.

An engine, which may in particular take the form of a rocket engine or a satellite engine, is equipped with a combustion chamber as described above.

BRIEF DESCRIPTION OF THE DRAWINGS

Preferred embodiments of the invention are explained in more detail below with reference to the accompanying schematic drawings, in which.

DETAILED DESCRIPTION OF PREFERRED EMBODIMENTS

Figure 1:
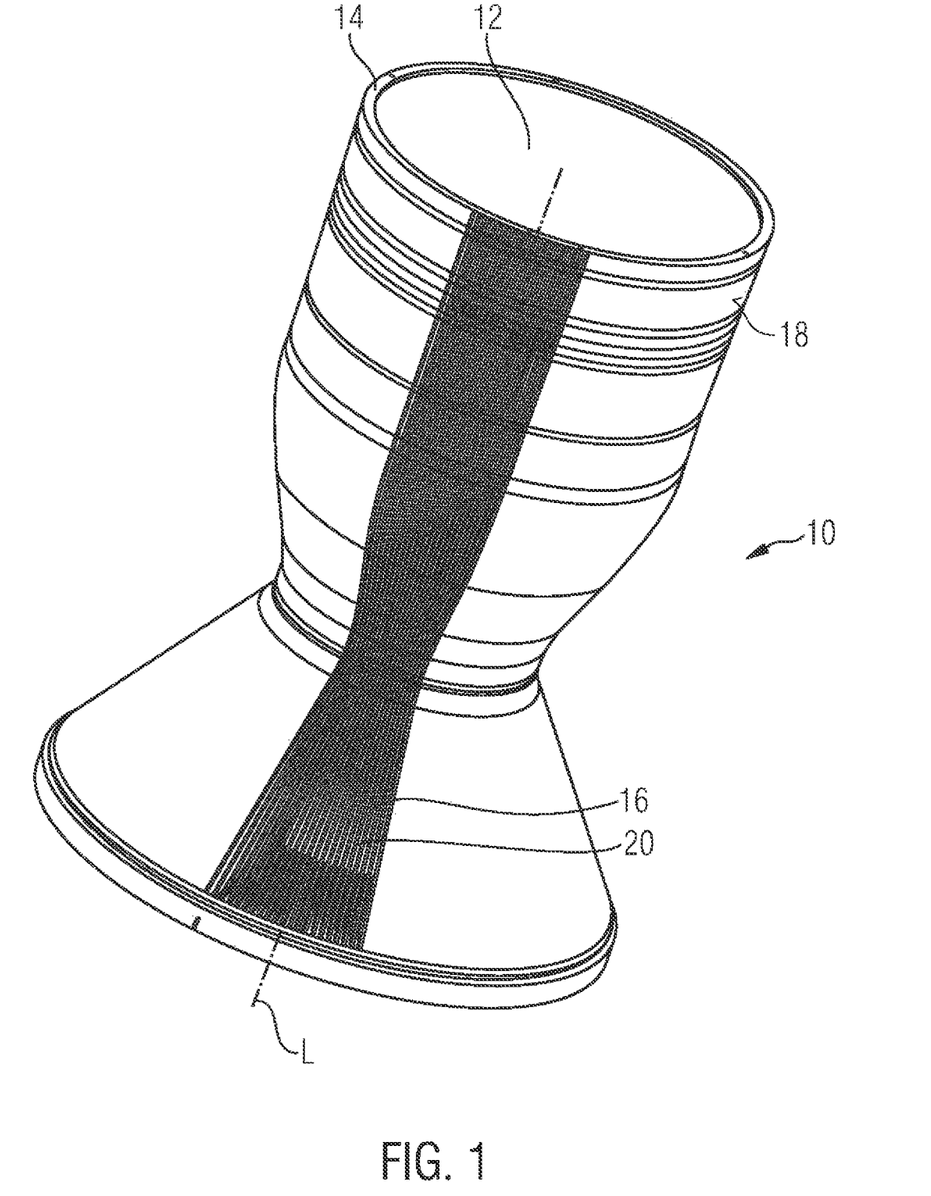
FIG. 1 shows a three-dimensional overview of a combustion chamber suitable for use in a rocket engine.
Figure 2:
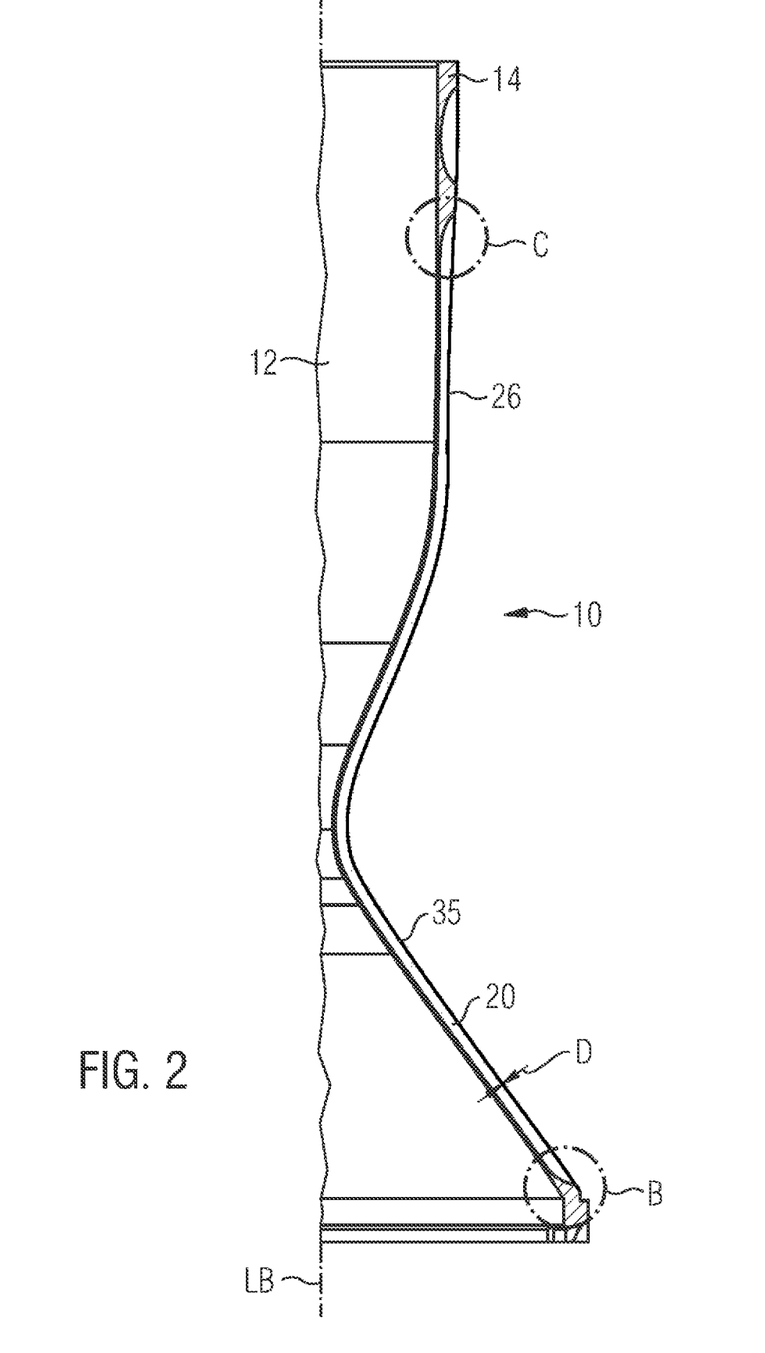
FIG. 2 shows a partial cross-sectional view of the combustion chamber according to FIG. 1, FIGS. 3a to c illustrate a method of manufacturing the combustion chamber according to FIG. 1.
Figure 3A:
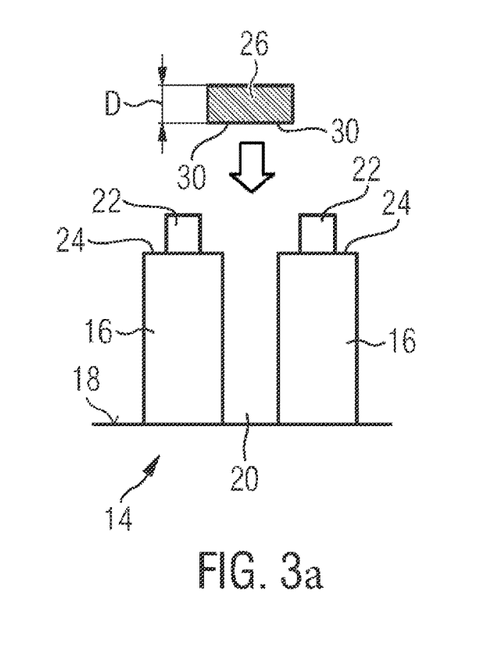

A combustion chamber 10 shown in FIGS. 1 and 2 and suitable for use in a rocket engine includes a combustion space 12 in which propellant is burned during operation of the combustion chamber, thereby generating thrust. The combustion space 12 is surrounded by a combustion space wall 14. Cooling channel webs 16 (see also FIGS. 3a to 3c) extend from a surface 18 of the combustion space wall 14 which faces away from the combustion space 12, and serve to separate adjacent cooling channels 20 from each other. The cooling channels 20 extend substantially along a longitudinal axis LB of the combustion chamber 10 and thus substantially perpendicular to a circumferential direction of the combustion chamber 10. The cooling channel webs 16 are integral formed with the combustion space wall 14 and, like the combustion space wall 14, consist of a copper alloy having good thermal conductivity.

The cooling channel webs 16 are each provided with a projection 22 extending from an end face 24 of the cooling channel webs 16 which faces away from the combustion space 12. The end face 24 of the cooling channel webs 16 which faces away from the combustion space 12 extends substantially parallel to the surface 18 of the combustion space wall 14 which faces away from the combustion space 12. In a direction parallel to the surface 18 of the combustion space wall 14 which faces away from the combustion space 12 and perpendicular to a longitudinal axis L of a cooling channel 20 delimited by two mutually adjacent cooling channel webs 16, the projections 22 have a reduced cross-section compared to the respective cooling channel webs 16 and each extend centrally from the end faces 24 of the cooling channel webs 16. Along the longitudinal axes L of the cooling channels 20, on the other hand, the cooling channel webs 16 and the projections 22 formed thereon have substantially the same dimensions, that is, the cooling channel webs 16 are provided with corresponding projections 22 along substantially their entire length along the longitudinal axes L of the cooling channels 20.

Figure 3B:
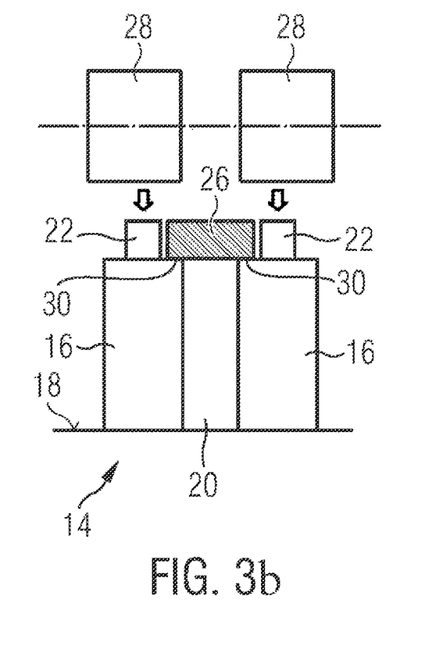
Figure 3C:
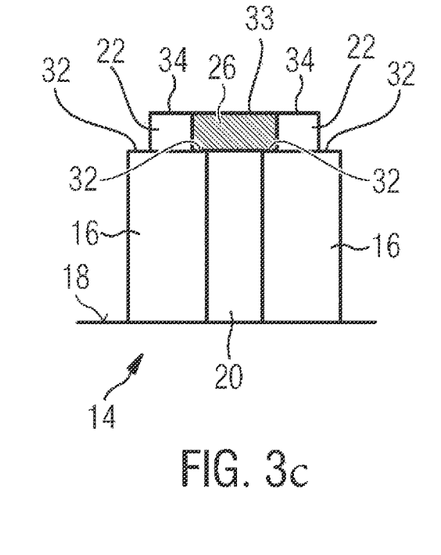

Furthermore, the combustion chamber 10 comprises a plurality of cover elements 26. The cover elements 26 are each made from a sheet, in particular a copper sheet metal, by, for example, eroding, laser processing or punching. As can best be seen from FIGS. 3a and b, during the manufacture of the combustion chamber 10, the cover elements 26 are arranged in such a way that each cover element 26 extends along a longitudinal axis L of a cooling channel 20 delimited by two mutually adjacent cooling channel webs 16, between the projections 22 of the mutually adjacent cooling channel webs 16. Finally, as shown in FIG. 3c, each cover element 26 is form-fittingly connected to the projections 22 of two adjacent cooling channel webs 16 in order to cover the cooling channel 20 extending between the adjacent cooling channel webs 16.

The form-fitting connection between the cover elements 26 and the projections 22 is made by roller caulking and/or flanging. In FIG. 3b, a rolling tool 28 is used to form the form-fitting connection between the cover elements 26 and the projections 22.

The cover elements 26 each have edge portions 30 extending substantially parallel to each other along the longitudinal axes L of the cooling channels and resting on corresponding end face portions 32 of the two mutually adjacent cooling channel webs 16. Since the projections 22 each extend centrally from the end faces 24 of the cooling channel webs 16, the end face portions 32 remaining on either side of the projections 22 are large enough to serve as a secure bearing surface for corresponding edge portions of two cover elements 26. Accordingly, each projection 22 of a cooling channel web 16 can be form-fittingly connected to two cover elements 26.

As can best be seen in FIG. 3b, the dimension of the projections 22 perpendicular to the end face 24 of the cooling channel webs 16 prior to the form-fitting connection with the cover elements 26 is slightly larger than a corresponding dimension, i.e. a thickness D, of the cover elements 26. This allows the projections 22 to be well crimped with the cover elements 26 by means of the rolling tool 28 and thereby form-fittingly connected with the cover elements 26. However, in the fully assembled combustion chamber 10, the dimension of the projections 22 in the direction perpendicular to the end face 24 of the cooling channel webs 16 substantially corresponds to the thickness D of the cover elements. In the fully assembled combustion chamber 10, the projections 22 and the cover elements 26 form-fittingly connected to the projections 22 therefore form an outer combustion chamber wall which has continuously substantially the same thickness.

Further, in the fully assembled combustion chamber 10, an outer surface 33 of the cover elements 26 which faces away from the combustion space 12 is aligned substantially coplanar with respective end faces 34 of the projections 16 provided on the cooling channel webs 16 which face away from the combustion space 12. The coplanar alignment of the outer surface 33 of the cover elements 26 with the end faces 34 of the projections 22 can already be achieved by appropriately dimensioning the projections 22 and the cover elements 26. However, if necessary, any excess material remaining after the cover elements 26 have been form-fittingly connected to the projections 22 may be removed by a machining process such as turning.

Finally, an outer combustion chamber wall defined by the cover elements 26 and the projections 22 provided on the cooling channel webs 16 is substantially parallel and coaxial with the combustion space wall 14. The outer combustion chamber wall is provided with a surface layer 35 applied to the outer surface of the cover elements 26 which face away from the combustion space 12. Furthermore, the end faces 34 of the projections 22 provided on the cooling channel webs 16 which face away from the combustion space 12 are provided with the surface layer 35.

Figure 4:
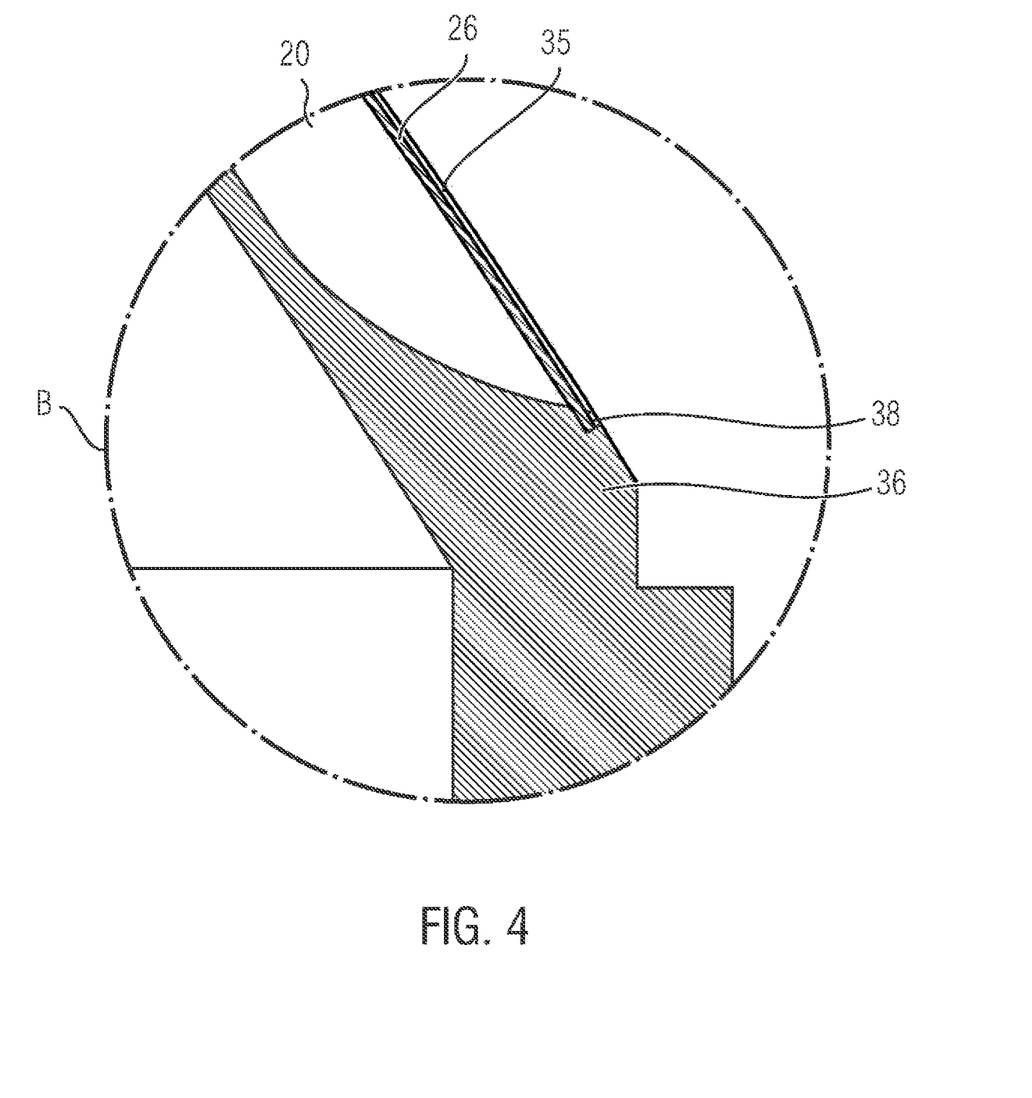
FIG. 4 shows an enlarged view of a first end facing end of a cooling channel of the combustion chamber according to FIG. 1.

As can best be seen in the enlarged view shown in FIG. 4, the cooling channels 20 are each delimited at a first end facing end by a first end element 36. In particular, the cooling channels 20 are shaped such that the depth of the cooling channels 20 decreases in the direction of their first end facing end, in that the thickness of the combustion space wall 14 increases in the direction of the first end facing ends of the cooling channels 20 and the thickened region of the combustion space wall 14 forms the first end element 36. The cover elements 26 are each form-fittingly connected to the first end element 36.

The form-fitting connection of the cover elements 26 to the first end elements 36 is produced by providing a projection 38 on the first end elements 36, which initially extends substantially perpendicular to a surface of the first end elements 36 which faces away from the combustion space 12. This projection 38 is then crimped to the cover elements 26, similar to the projections 22 formed on the cooling channel webs 16, and thereby form-fittingly connected to the cover elements 26.

Figure 5:
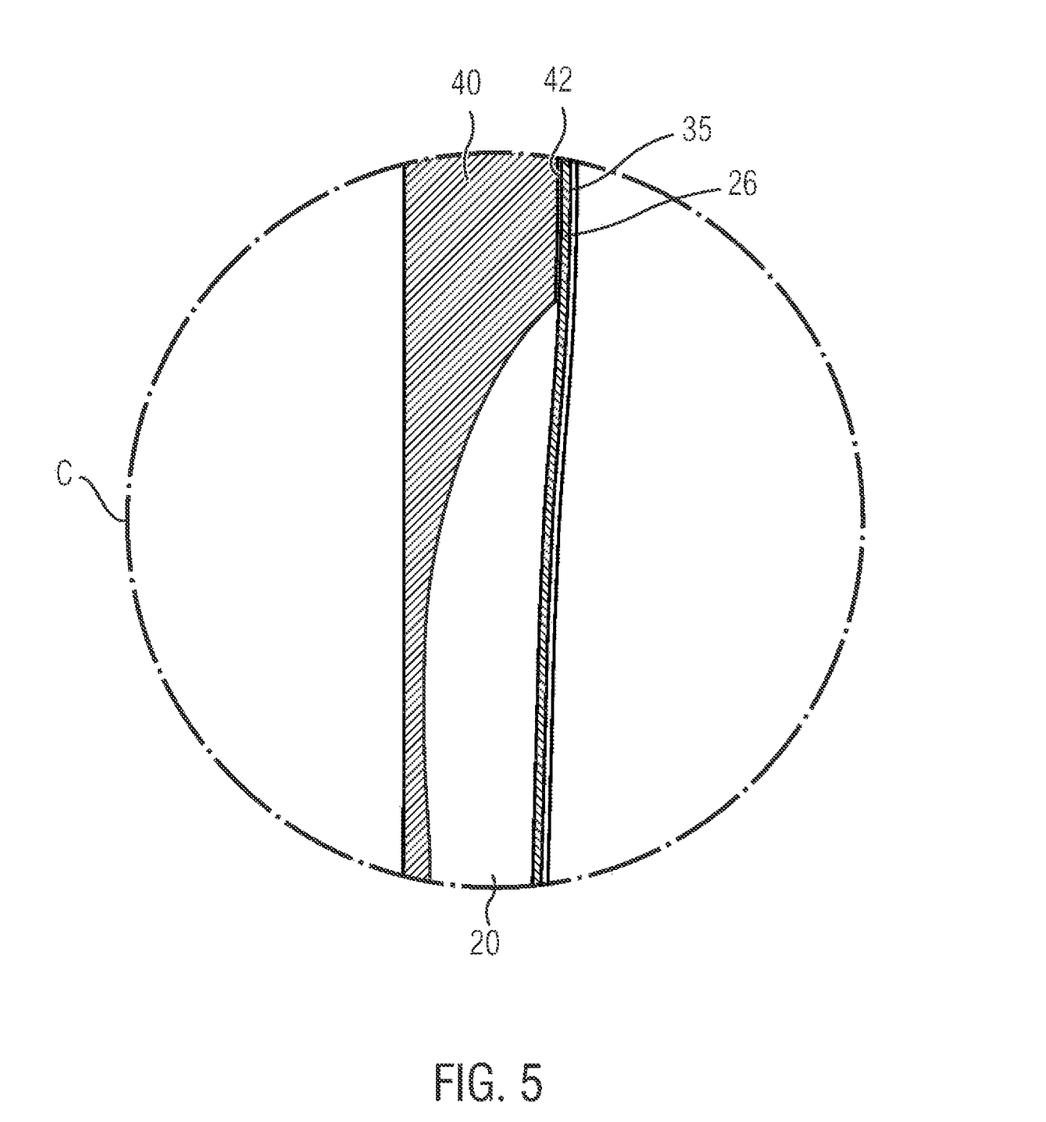
FIG. 5 shows an enlarged view of a second end facing end of a cooling channel of the combustion chamber according to FIG. 1.

At a second end facing end, the cooling channels 20 are delimited by a second end element 40, as shown in FIG. 5. In particular, the cooling channels 20 are shaped such that the depth of the cooling channels 20 decreases in the direction of their second end facing end, in that the thickness of the combustion space wall 14 increases in the direction of the second end facing ends of the cooling channels 20 and the thickened region of the combustion space wall 14 forms the second end element 40. In the region of the second end facing ends of the cooling channels 20, no form-fitting connection of the second end elements 40 to the cover elements 26 is provided. Rather, a pressure equalization opening 42 is provided at each of the second end facing ends of the cooling channels 20 between the cover elements 26 and the second end elements 40.

When the surface layer 35 is produced on the outer surface of the outer combustion chamber wall which faces away from the combustion space 12 by cold gas spraying followed by heat treatment, the pressure equalization openings 42 provided at the second end facing ends of the cooling channels 20 prevent the pressure in the cooling channels 20 from increasing too much during the heat treatment. On the other hand, when the surface layer 35 is formed by an electroplating process, heat treatment of the surface layer 35 is generally not required. The pressure equalization ports 42 should then be omitted to ensure that the coolant channels 20 in the finished combustion chamber 10 are tight.

The cover elements 26 are then, for example, each form-fittingly connected also to the second end element 40. For this purpose, a projection may again be provided on the second end elements 40, which initially extends substantially perpendicularly to a surface of the second end elements 40 which faces away from the combustion space 12. This projection may then be crimped to the cover elements 26, similar to the projection 38 formed on the first end elements 36, and thereby form-fittingly connected to the cover elements 26.

The invention claimed is:

1. A combustion chamber, in particular for use in an engine, the combustion chamber comprising:
    a combustion space;
    a combustion space wall delimiting the combustion space;
    a plurality of cooling channel webs extending from a surface of the combustion space wall which faces away from the combustion space and separating mutually adjacent cooling channels from one another, the cooling channel webs each being provided with a projection extending centrally from an end face of the cooling channel webs which faces away from the combustion space and extends in a direction parallel to the surface of the combustion space wall which faces away from the combustion space, wherein the projection of a respective cooling channel web has a smaller cross section than a respective cooling channel web in a direction parallel to the surface of the combustion space wall which faces away from the combustion space and perpendicular to a longitudinal axis of a cooling channel adjacent to the respective cooling channel web so that an edge portion of an end face of a cooling channel web is not covered by the respective, projection; and
    a plurality of cover elements, each cover element extending along a longitudinal axis of a cooling channel delimited by two mutually adjacent cooling channel webs between the projections of the mutually adjacent cooling channel webs and being form-fittingly connected to the projections of the two mutually adjacent cooling channel webs in order to cover the cooling channel.

2. The combustion chamber according to claim 1,
wherein the cover elements each have edge portions which rest on corresponding end face portions of the two mutually adjacent cooling channel webs; and/or
wherein the projections provided on the cooling channel webs extend in a direction parallel to the surface of the combustion space wall which faces away from the combustion space and perpendicular to the longitudinal axis of a cooling channel delimited by two mutually adjacent cooling channel webs, centrally from the end face of the cooling channel webs which faces away from the combustion space.

3. The combustion chamber according to claim 1,
wherein a dimension of the projections provided on the cooling channel webs in a direction perpendicular to the end face of the cooling channel webs which faces away from the combustion space substantially corresponds to a dimension of the cover elements in the direction perpendicular to the end face of the cooling channel webs which faces away from the combustion space; and/or
wherein an outer surface of the cover elements which faces away from the combustion space is aligned substantially coplanar with end faces of the projections provided on the cooling channel webs which face, away from the combustion space; and/or
wherein an outer combustion chamber wall defined by the cover elements and the projections provided on the cooling channel webs is oriented substantially parallel and/or coaxial to the combustion space wall.

4. The combustion chamber according to claim 1,
wherein the cover elements are each produced by eroding, laser cutting or punching and/or wherein the cover elements are each produced from a metal sheet, in particular a copper sheet.

5. The combustion chamber according to claim 1,
wherein the cooling channels are delimited at a first end facing end by a first end element and wherein the cover elements are form-fittingly connected to the first end element; and/or
wherein the cooling channels are delimited at a second end facing end by a second end element and wherein a pressure equalization opening is provided between the cover elements and the second end elements.

6. The combustion chamber according to claim 1,
wherein the outer combustion chamber wall defined by the cover elements and the projections provided on the cooling channel webs is provided with a surface layer applied to the outer surface of the cover elements which faces away from the combustion space and to the end faces of the projections provided on the cooling channel webs which face away from the combustion space.

7. A method of manufacturing a combustion chamber particularly suitable for use in an engine, the method comprising the steps:
providing a combustion space wall delimiting a combustion space;
providing a plurality of cooling channel webs extending, from a surface of the combustion space wall which faces away from the combustion space and separating mutually adjacent cooling channels from one another, the cooling channel webs each being provided with a projection extending from an end face of the cooling channel webs which faces away from the combustion space;
arranging a plurality of cover elements such that portions of each cover element rest on corresponding end face portions of the mutually adjacent cooling channel webs which are not covered by the projections of the mutually adjacent cooling channel webs and such that each cover element extends along a longitudinal axis of a cooling channel delimited by the two mutually adjacent cooling channel webs between the projections of the mutually adjacent cooling channel webs thereby covering the cooling channel extending between the mutually adjacent cooling channel webs, wherein the longitudinal axis extends parallel to the surface of the combustion space wall which faces away from the combustion space; and
after having arranged the plurality of cover elements, form-fittingly connecting each cover element to the projections of two mutually adjacent cooling channel webs.

8. The method according to claim 7,
wherein the cover elements are form-fittingly connected to the projections of the mutually adjacent cooling channel webs by rolling, caulking and/or flanging.

9. The method according, to claim 7,
wherein the projections provided on the cooling channel webs extend in a direction parallel to the surface of the combustion space wall which faces away from the combustion space and perpendicular to the longitudinal axis of a cooling channel delimited by two mutually adjacent cooling channel webs, centrally from the end face of the cooling channel webs which faces away from the combustion space.

10. The method according to claim 7,
wherein a dimension of the projections provided on the cooling channel webs in a direction perpendicular to the end face of the cooling channel webs which faces away from the combustion space substantially corresponds to a dimension of the cover elements in the direction perpendicular to the end face of the cooling channel webs which faces away from the combustion space; and/or
wherein an outer surface of the cover elements which faces away from the combustion space is aligned substantially coplanar with end faces of the projections provided on the cooling channel webs which face away from the combustion space; and/or
wherein an outer combustion chamber wall defined by the cover elements and the projections provided on the cooling channel webs is oriented substantially parallel and/or coaxial to the combustion space wall.

11. The method according to claim 7,
wherein the cover elements are produced by eroding, laser processing or punching and/or wherein the cover elements are produced from a metal sheet, in particular a copper sheet.

12. The method according to claim 7,
wherein the cooling channels are delimited at a first end facing end by a first end element and wherein the cover elements are form-fittingly connected to the first end element; and/or
wherein the cooling channels are delimited at a second end facing end by a second end element and wherein a pressure equalization opening is provided between the cover elements and the second end elements.

13. The method according to claim 7,
wherein the outer combustion chamber wall defined by the cover elements and the projections provided on the cooling channel webs is provided with a surface layer applied to the outer surface of the cover elements which face away from the combustion space and to the end faces of the projections provided on the cooling channel webs which face away from the combustion space.

14. The combustion chamber according to claim 2,
wherein a dimension of the projections provided on the cooling channel webs in a direction perpendicular to the end face of the cooling channel webs which faces away from the combustion space substantially corresponds to a dimension of the cover elements in the direction perpendicular to the end face of the cooling channel webs which faces away from the combustion space; and/or
wherein an outer surface of the cover elements which faces away from the combustion space is aligned substantially coplanar with end faces of the projections provided on the cooling channel webs which face away from the combustion space; and/or
wherein an outer combustion chamber wall defined by the cover elements and the projections provided on the cooling channel webs is oriented substantially parallel and/or coaxial to the combustion space wall.

15. The method according to claim 8,
wherein the cover elements are arranged such that edge portions of the cover elements rest on corresponding end face portions of the two mutually adjacent cooling channel webs; and/or
wherein the projections provided on the cooling channel webs extend in a direction parallel to the surface of the combustion space wall which faces away from the combustion space and perpendicular to the longitudinal axis of a cooling channel delimited by two mutually adjacent cooling channel webs, centrally from the end face of the cooling channel webs which faces away from the combustion space.

16. A combustion chamber, in particular for use in an engine, the combustion chamber comprising:
a combustion space;
a combustion space wall delimiting the combustion space;
a plurality of cooling channel webs extending from a surface of the combustion space wall which faces away from the combustion space and separating mutually adjacent cooling channels from one another, the cooling channel webs each being provided with a projection extending from an end face of a respective cooling channel web which faces away from the combustion space; and a plurality of cover elements, each cover element extending along a longitudinal axis of a cooling channel delimited by two mutually adjacent cooling channel webs between the projections of the mutually adjacent cooling channel webs and being form-fittingly connected to the projections of the two mutually adjacent cooling channel webs, in order to cover the cooling channel, wherein each of the cover elements has edge portions which rest on corresponding end face portions of the two mutually adjacent cooling channel webs which are not covered by the projection of the respective cooling channel web.

* * * * *